US012298934B2

(12) United States Patent
Wang et al.

(10) Patent No.: US 12,298,934 B2
(45) Date of Patent: May 13, 2025

(54) METHOD AND DEVICE FOR LOCAL RANDOM READAHEAD OF FILE IN DISTRIBUTED FILE SYSTEM

(71) Applicant: INSPUR SUZHOU INTELLIGENT TECHNOLOGY CO., LTD., Suzhou Jiangsu (CN)

(72) Inventors: Shuaiyang Wang, Suzhou Jiangsu (CN); Wenpeng Li, Suzhou Jiangsu (CN); Duan Zhang, Suzhou Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 88 days.

(21) Appl. No.: 17/928,347

(22) PCT Filed: Jan. 22, 2021

(86) PCT No.: PCT/CN2021/073356

§ 371 (c)(1),
(2) Date: Nov. 29, 2022

(87) PCT Pub. No.: WO2021/238252

PCT Pub. Date: Dec. 2, 2021

(65) Prior Publication Data

US 2023/0214354 A1 Jul. 6, 2023

(30) Foreign Application Priority Data

May 29, 2020 (CN) ......................... 202010474760.1

(51) Int. Cl.

| | |
|---|---|
| ***G06F 16/00*** | (2019.01) |
| ***G06F 16/13*** | (2019.01) |
| ***G06F 16/182*** | (2019.01) |

(52) U.S. Cl.
CPC .......... *G06F 16/134* (2019.01); *G06F 16/182* (2019.01)

(58) Field of Classification Search
CPC ....... G06F 16/134; G06F 16/182; G06F 16/13
See application file for complete search history.

(56) References Cited

U.S. PATENT DOCUMENTS

2005/0114289 A1* 5/2005 Fair .................... G06F 12/0862
2015/0046659 A1 2/2015 Wu
(Continued)

FOREIGN PATENT DOCUMENTS

CN 101158965 A 4/2008
CN 101388824 A 3/2009
(Continued)

OTHER PUBLICATIONS

Search report for International application No. PCT/CN2021/073356 mailed on Apr. 7, 2021.
(Continued)

*Primary Examiner* — Alex Gofman
*Assistant Examiner* — Suman Rajaputra
(74) *Attorney, Agent, or Firm* — Dennemeyer & Associates LLC

(57) ABSTRACT

Provided are a method and device for local random readahead of a file in a distributed file system. The method includes: creating a readahead structure pointer in an operation handle of a file; in response to reading of the file, accessing and updating information in the readahead structure pointer, and determining whether the reading is local random reading; and performing readahead in a case where the reading is local random reading, the number of instances of continuous reading in the updated information is greater than 1, and a current reading position is greater than or equal to a readahead trigger position in the updated information.

16 Claims, 2 Drawing Sheets

(56) References Cited

U.S. PATENT DOCUMENTS

2015/0242437 A1* 8/2015 Lee ........................ G06F 16/182
707/827
2017/0004086 A1 1/2017 An et al.

FOREIGN PATENT DOCUMENTS

| | | | |
|---|---|---|---|
| CN | 102385622 | A | 3/2012 |
| CN | 103608785 | A | 2/2014 |
| CN | 108874310 | A | 11/2018 |
| CN | 110389709 | A | 10/2019 |
| CN | 110502498 | A | 11/2019 |
| CN | 111625503 | A | 9/2020 |

OTHER PUBLICATIONS

Chinese Search report for application No. 202010474760.1 filed on May 29, 2020.

* cited by examiner

METHOD AND DEVICE FOR LOCAL RANDOM READAHEAD OF FILE IN DISTRIBUTED FILE SYSTEM

CROSS-REFERENCE TO RELATED APPLICATION

This application is a National Stage Filing of PCT International Application No. PCT/CN2021/073356 filed on Jan. 22, 2021, which is based upon and claims priority to Chinese Patent Application No. 202010474760.1, filed to the China National Intellectual Property Administration on May 29, 2020 and entitled "Method and Device for Local Random Readahead of File in Distributed File System", the disclosure of which is hereby incorporated by reference in its entirety.

TECHNICAL FIELD

The present disclosure relates to the field of computers, and more specifically, to a method and device for local random readahead of a file in a distributed file system.

BACKGROUND

For a distributed file system (object storage), the bottleneck of performing an Input and/or Output (I/O) operation in a large file mainly lies in a network and a disk. The performance of a memory far exceeds the performance of a network and a disk, and therefore readahead can remedy the weakness of low performance of the network and disk, and enhance the overall reading performance. Currently, a readahead mechanism is supported in a distributed file storage server, but only when the server receives sequential I/O. At present, software concurrent processing has been widely used, and when a user performs sequential reading, after concurrent I/O is forwarded by protocol software, the I/O received by the storage server presents characteristics of local random reading. In such a case, readahead cannot achieve an expected effect.

SUMMARY

In view of the above, embodiments of the present disclosure provide a method and device for local random readahead of a file in a distributed file system. By means of the method of the embodiments of the present disclosure, the readahead performance in a local random reading scenario for a large file may be improved, the pressure of small block I/O on a network disk may be avoided, and the pressure on a network and a disk in the local random reading scenario for the large file may thus be reduced.

An aspect of the embodiments of the present disclosure provides a method for local random readahead of a file in a distributed file system, including the following operations.

A readahead structure pointer is created in an operation handle of a file.

In response to reading of the file, information in the readahead structure pointer is accessed and updated, and whether the reading is local random reading is determined.

Readahead is performed in a case where the reading is local random reading, the number of instances of continuous reading in the updated information is greater than 1, and a current reading position is greater than or equal to a readahead trigger position in the updated information.

According to an embodiment of the present disclosure, the information in the readahead structure pointer includes:

a last reading end position, a last readahead end position, a last readahead size, the number of instances of sequential reading, a data amount of sequential reading, a local random reading window, a maximum readahead size, and the readahead trigger position.

According to an embodiment of the present disclosure, the operation that in response to reading of the file, the information in the readahead structure pointer is accessed and updated, and whether the reading is local random reading is determined includes the following operations.

In a case where a current reading position is the same as the last reading end position, 1 is added to the number of instances of sequential reading, and a random length is added to the data amount of sequential reading.

In a case where the current reading position is different from the last reading end position, whether a data amount that differs between a current reading offset and the last reading end position is within one random window is determined.

In a case where the data amount that differs between the current reading offset and the last reading end position is within one random window, the current reading is determined to be local random reading.

According to an embodiment of the present disclosure, the method further includes the following operation.

In a case where the current reading is not local random reading, the number of instances of sequential reading and the data amount of sequential reading are set to zero.

According to an embodiment of the present disclosure, the local random reading window and the maximum readahead size are stored in global configuration.

Another aspect of the embodiments of the present disclosure further provides a device for local random readahead of a file in a distributed file system. The device includes a creation module, a determination module, and a readahead module.

The creation module is configured to create a readahead structure pointer in an operation handle of a file.

The determination module is configured to, in response to reading of the file, access and update information in the readahead structure pointer, and determine whether the reading is local random reading.

The readahead module is configured to perform readahead in a case where the reading is local random reading, the number of instances of continuous reading in the updated information is greater than 1, and a current reading position is greater than or equal to a readahead trigger position in the updated information.

According to an embodiment of the present disclosure, the information in the readahead structure pointer includes: a last reading end position, a last readahead end position, a last readahead size, the number of instances of sequential reading, a data amount of sequential reading, a local random reading window, a maximum readahead size, and the readahead trigger position.

According to an embodiment of the present disclosure, the determination module is further configured to perform the following operations.

In a case where a current reading position is the same as the last reading end position, 1 is added to the number of instances of sequential reading, and a preset length is added to the data amount of sequential reading.

In a case where the current reading position is different from the last reading end position, whether a data amount that differs between a current reading offset and the last reading end position is within one random window is determined.

In a case where the data amount that differs between the current reading offset and the last reading end position is within one random window, the current reading is determined to be local random reading.

According to an embodiment of the present disclosure, the device further includes a zero-setting module. The zero-setting module is configured to, in a case where the current reading is not local random reading, set the number of instances of sequential reading and the data amount of sequential reading to zero.

According to an embodiment of the present disclosure, the local random reading window and the maximum readahead size are stored in global configuration.

The technical solution in the embodiments of the present disclosure has the following beneficial technical effects. According to the method and device for local random readahead of a file in a distributed file system provided in the embodiments of the present disclosure, the readahead structure pointer is created in the operation handle of a file: in response to reading of the file, information in the readahead structure pointer is accessed and updated, and whether the reading is local random reading is determined; and readahead is performed in the case where the reading is local random reading, the number of instances of continuous reading in the updated information is greater than 1, and the current reading position is greater than or equal to the readahead trigger position in the updated information. By virtue of the solution, the readahead performance in a local random reading scenario for a large file may be improved, the pressure of small block I/O on a network disk may be avoided, and the pressure on a network and a disk in the local random reading scenario for the large file may thus be reduced.

BRIEF DESCRIPTION OF THE DRAWINGS

In order to illustrate the technical solutions in the embodiments of the present disclosure or technical solutions in the related art more clearly, the drawings used in the technical description of the embodiments will be briefly described below: It is apparent that the drawings in the following descriptions are merely some embodiments of the present disclosure. Other embodiments can be obtained from those having ordinary skill in the art according to these drawings without any creative work.

DETAILED DESCRIPTION

To make the objectives, technical solutions and advantages of the present disclosure clearer, the present disclosure is further described in detail with reference to exemplary embodiments and the drawings.

Figure 1:
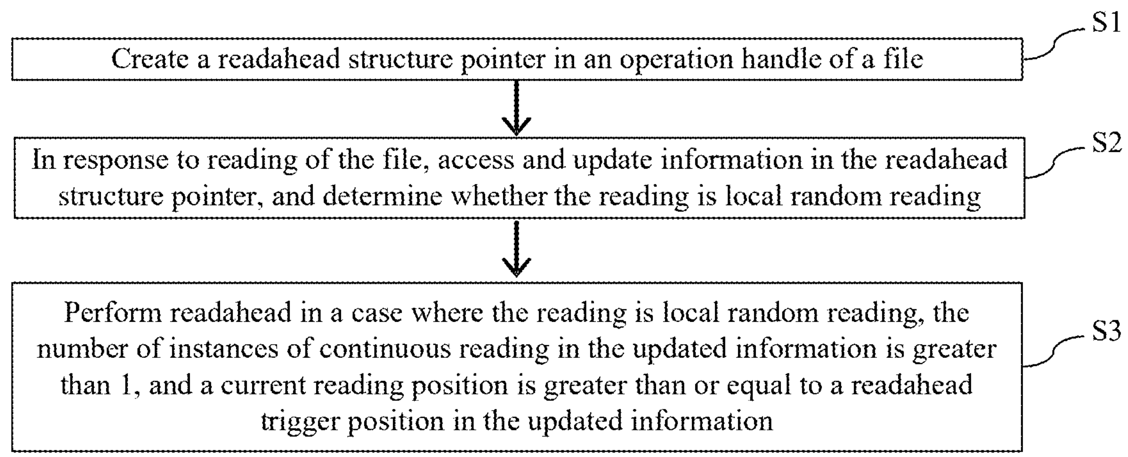
FIG. 1 is a schematic flowchart of a method for local random readahead of a file in a distributed file system according to an embodiment of the present disclosure.

A first aspect of the embodiments of the present disclosure provides a method for local random readahead of a file in a distributed file system. FIG. 1 is a schematic flowchart of the method.

As shown in FIG. 1, the method may include the following operations.

At S1, a readahead structure pointer is created in an operation handle of a file. When a file is opened, a readahead data structure is created, and a random window fw and a maximum readahead size max_bs are stored in the readahead data structure of the file. The readahead structure pointer is saved in a data structure corresponding to the operation handle. When the file is closed, the readahead structure pointer is deleted as the operation handle is deleted. A basic readahead data structure records a current read state of the file for readahead operation identification and readahead position recording.

At S2, in response to reading of the file, information in the readahead structure pointer is accessed and updated, and whether the reading is local random reading is determined.

At S3, readahead is performed in a case where the reading is local random reading, the number of instances of continuous reading in the updated information is greater than 1, and a current reading position is greater than or equal to a readahead trigger position in the updated information. When performing the readahead, a readahead offset is a last readahead end position, and a readahead size is twice a last readahead size. If the last readahead size is 0, the readahead size is set to be equal to a data amount of the current sequential reading. An actual readahead size is determined according to a maximum readahead size max_bs. The readahead size is updated as the current actual readahead size. A readahead trigger position is updated as [(a reading end position+the current actual readahead size)/2]. The readahead end position is updated as the last readahead end position plus the current readahead size.

By means of the technical solution of the embodiments of the present disclosure, the readahead performance in a local random reading scenario for a large file may be improved, the pressure of small block I/O on a network disk may be avoided, and the pressure on a network and a disk in the local random reading scenario for the large file may thus be reduced.

Figure 3:
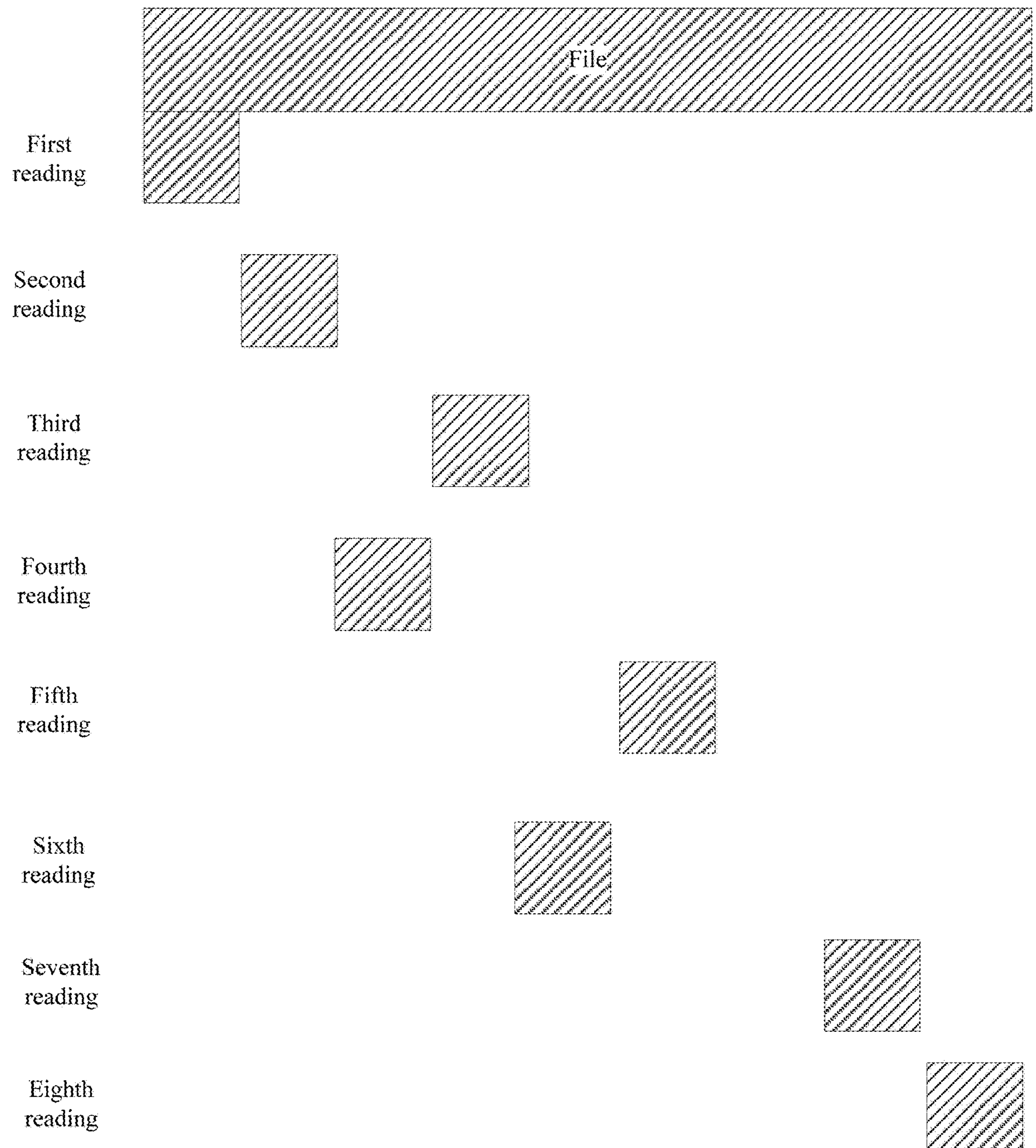
FIG. 3 is a schematic diagram of local random reading according to an embodiment of the present disclosure.

FIG. 3 is an exemplary embodiment of local random reading. For example, a reading operation is performed on a file with a block size of IM, and a read sequence is that: a first data block is read in a first reading: a second data block is read in a second reading: a fourth data block is read in a third reading: a third data block is read in a fourth reading: a sixth data block is read in a fifth reading: a fifth data block is read in a sixth reading: a seventh data block is read in a seventh reading; and an eighth data block is read in an eighth reading. The first, second, seventh, and eighth reading are in order, while the third, fourth, fifth, and sixth reading are out of order within a range of two blocks. Herein, a reading process in which out-of-order reading is performed within a certain window but the overall reading is sequential reading is defined or considered as local random reading. If the window (period) is 2 data blocks in the scenario shown in FIG. 3, the overall reading may be regarded as being performed in order.

In an exemplary embodiment of the present disclosure, the information in the readahead structure pointer includes: a last reading end position (last_pos), a last readahead end position (last_readahead_pos), a last readahead size (readahead_size), the number of instances of sequential reading (seq_num), a data amount of sequential reading (seq_bytes), a local random reading window (fw), a maximum readahead size (max_bs), and a readahead trigger position (trigger_pos).

In an exemplary embodiment of the present disclosure, the operation that in response to reading of the file, accessing and updating information in the readahead structure pointer, and determining whether the reading is local random reading includes the following operations.

In a case where a current reading position is the same as the last reading end position, 1 is added to the number of instances of sequential reading, and len (a random length) is added to the data amount of sequential reading.

In a case where the current reading position is different from the last reading end position, whether a data amount that differs between a current reading offset and the last reading end position is within one random window is determined.

In a case where the data amount that differs between the current reading offset and the last reading end position is within one random window, the current reading is determined to be local random reading. When a reading service is processed, a reading mode is determined according to a reading parameter of the file, the random length len, readahead cache information last_pos and the readahead window fw, specifically:

if the current reading position is the same as the last reading end position last_pos, the reading is considered to be sequential reading, and the readahead cache structure is updated as follows: 1 is added to the number of instances of sequential reading, and len is added to the data amount of sequential reading:

if the current reading position is different from the last reading end position, whether the current reading is within the local random reading window is determined, that is, whether a data amount that differs between a current reading offset and the last reading end position is within one random window, that is, |file reading offset−last_pos|<=local random reading window fw. If the above condition is met, the current reading is local random reading, and the readahead cache structure is updated as follows: 1 is added to the number of instances of sequential reading, and len is added to the data amount of sequential reading.

In an exemplary embodiment of the present disclosure, the method further includes the following operation.

In a case where the current reading is not local random reading, the number of instances of sequential reading and the data amount of sequential reading are set to zero. The readahead cache information of the current reading end position last_pos is updated as follows: last_pos is equal to the current reading offset+the current reading length len.

In an exemplary embodiment of the present disclosure, the local random reading window and the maximum readahead size are stored in global configuration. According to characteristics of a concurrency protocol of a current system such as a Network File System (NFS), the local random reading window fw and the maximum readahead size are manually configured and stored in the global configuration globle_config.

By means of the technical solution of the embodiments of the present disclosure, the readahead performance in a local random reading scenario for a large file may be improved, the pressure of small block I/O on a network disk may be avoided, and the pressure on a network and a disk in the local random reading scenario for the large file may thus be reduced.

It is to be noted that, those having ordinary skill in the art can understand that all or part of the processes in the above method embodiments may be implemented by related hardware through the instructions of a computer program, and the program may be stored in a computer-readable storage medium. When the program is executed, the flow of each method embodiment as described above may be included. The storage medium may be a magnetic disk, an optical disk, a Read-Only Memory (ROM), or a Random Access Memory (RAM), or the like. The embodiments of the computer program may achieve the same or similar effects as any of the foregoing method embodiments corresponding to the embodiments of the computer program.

In addition, the methods provided in the embodiments of the present disclosure may also be implemented as a computer program executed by a Central Processing Unit (CPU), and the computer program may be stored in a computer-readable storage medium. When the computer program is executed by the CPU, the above functions defined in the methods provided in the embodiments of the present disclosure are executed.

Figure 2:
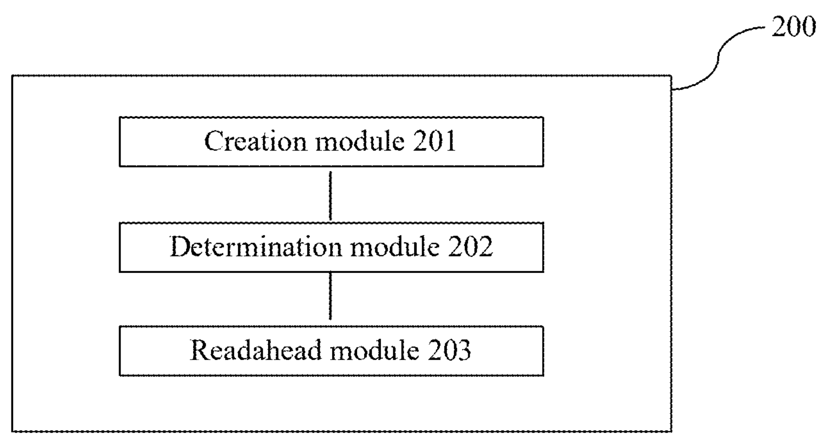
FIG. 2 is a schematic diagram of a device for local random readahead of a file in a distributed file system according to an embodiment of the present disclosure.

A second aspect of the embodiments of the present disclosure provides a device for local random readahead of a file in a distributed file system. As shown in FIG. 2, the device 200 includes a creation module 201, a determination module 202, and a readahead module 203.

The creation module 201 is configured to create a readahead structure pointer in an operation handle of a file.

The determination module 202 is configured to, in response to reading of the file, access and update information in the readahead structure pointer, and determine whether the reading is local random reading.

The readahead module 203 is configured to perform readahead in a case where the reading is local random reading, the number of instances of continuous reading in the updated information is greater than 1, and a current reading position is greater than or equal to a readahead trigger position in the updated information.

In an exemplary embodiment of the present disclosure, the information in the readahead structure pointer includes: a last reading end position, a last readahead end position, a last readahead size, the number of instances of sequential reading, a data amount of sequential reading, a local random reading window, a maximum readahead size, and the readahead trigger position.

In an exemplary embodiment of the present disclosure, the determination module 202 is further configured to perform the following operations.

In a case where a current reading position is the same as the last reading end position, 1 is added to the number of instances of sequential reading, and len is added to the data amount of sequential reading.

In a case where the current reading position is different from the last reading end position, whether a data amount that differs between a current reading offset and the last reading end position is within one random window is determined.

In a case where the data amount that differs between the current reading offset and the last reading end position is within one random window, the current reading is determined to be local random reading.

In an exemplary embodiment of the present disclosure, the device 200 further includes a zero-setting module. The zero-setting module is configured to, in a case where the current reading is not local random reading, set the number of instances of sequential reading and the data amount of sequential reading to zero.

In an exemplary embodiment of the present disclosure, the local random reading window and the maximum readahead size are stored in global configuration.

It is to be particularly noted that, an operating process of each module in the embodiments of the above system may refers to the embodiments of the above method. It can readily be conceivable to those having ordinary skill in the art that these modules may be applied to other embodiments of the above method.

In addition, the above method operations and system units or modules may also be implemented by a controller and a computer-readable storage medium for storing a computer program that enables the controller to implement the functions of the above operations or units or modules.

Those having ordinary skill in the art will also appreciate that, the various exemplary logical blocks, modules, circuits, and algorithm operations described in combination with the disclosure may be implemented as electronic hardware, computer software, or a combination of the electronic hardware and the computer software. To clearly describe such interchangeability of hardware and software, various illustrative components, blocks, modules, circuits, and operations have been described generally in terms of their functionality. Whether such functionality is implemented as software or hardware depends on the specific application and design constraints imposed on the entire system. Those having ordinary skill in the art may implement the functions in various ways for each specific application, but such implementation decisions should not be interpreted as causing a departure from the scope of the disclosed embodiments of the present disclosure.

The above embodiments, particularly any "exemplary" embodiments, are possible examples of implementations, and are proposed merely for a clear understanding of the principles of the embodiments of the present disclosure. Numerous changes and modifications may be made to the above embodiments without departing from the principles of the technology described herein. All modifications are intended to be included within the scope of the disclosure and protected by the appended claims.

What is claimed is:

1. A method for local random readahead of a file in a distributed file system, comprising:

creating a readahead structure pointer in an operation handle of a file;

in response to reading of the file, accessing and updating information in the readahead structure pointer, and determining whether the reading is local random reading; and performing readahead in a case where the reading is local random reading, the number of instances of continuous reading in the updated information is greater than 1, and a current reading position is greater than or equal to a readahead trigger position in the updated information;

wherein the information in the readahead structure pointer comprises: a last reading end position, a last readahead end position, a last readahead size, the number of instances of sequential reading, a data amount of sequential reading, a local random reading window, a maximum readahead size, and the readahead trigger position;

wherein in response to reading of the file, accessing and updating information in the readahead structure pointer comprises:

where a current reading position is the same as the last reading end position, adding 1 to the number of instances of sequential reading, and adding a preset length to the data amount of sequential reading;

wherein in response to reading of the file, determining whether the reading is local random reading comprises:

where the current reading position is different from the last reading end position, determining whether a data amount that differs between a current reading offset and the last reading end position is within one random window, the one random window being the local random reading window; and in response to where the data amount that differs between the current reading offset and the last reading end position is within the one random window, determining the current reading to be local random reading.

2. The method according to claim 1, further comprising:

in a case where the current reading is not local random reading, setting the number of instances of sequential reading and the data amount of sequential reading to zero.

3. The method according to claim 1, wherein the local random reading window and the maximum readahead size are stored in global configuration.

4. A device for local random readahead of a file in a distributed file system, comprising a memory storing instructions and a processor in communication with the memory, wherein the processor is configured to execute the instructions to:

create a readahead structure pointer in an operation handle of a file;

in response to reading of the file, access and update information in the readahead structure pointer, and determine whether the reading is local random reading; and perform readahead in a case where the reading is local random reading, the number of instances of continuous reading in the updated information is greater than 1, and a current reading position is greater than or equal to a readahead trigger position in the updated information;

wherein the information in the readahead structure pointer comprises: a last reading end position, a last readahead end position, a last readahead size, the number of instances of sequential reading, a data amount of sequential reading, a local random reading window, a maximum readahead size, and the readahead trigger position;

wherein the processor, when being configured to execute the instructions to access and update information in the readahead structure pointer, is configured to execute the instructions to:

where a current reading position is the same as the last reading end position, add 1 to the number of instances of sequential reading, and add a preset length to the data amount of sequential reading;

wherein the processor, when being configured to execute the instructions to determine whether the reading is local random reading, is configured to execute the instructions to:

where the current reading position is different from the last reading end position, determine whether a data amount that differs between a current reading offset and the last reading end position is within one random window; the one random window being the local random reading window; and in response to where the data amount that differs between the current reading offset and the last reading end position is within one random window, determine the current reading to be local random reading.

5. The device according to claim 4, wherein the processor is further configured to execute the instructions to, in a case where the current reading is not local random reading, set the number of instances of sequential reading and the data amount of sequential reading to zero.

6. The device according to claim 4, wherein the local random reading window and the maximum readahead size are stored in global configuration.

7. The method according to claim 1, wherein when performing the readahead, a readahead offset is the last readahead end position, and a readahead size is twice the last readahead size.

8. The method according to claim 7, wherein when performing the readahead, in a case where the last readahead size is 0, the readahead size is set to be equal to the data amount of the current sequential reading.

9. The method according to claim 7, wherein when performing the readahead, an actual readahead size is determined according to the maximum readahead size, and the readahead size is updated as the current actual readahead size.

10. The method according to claim 9, wherein the readahead trigger position is updated as [(the reading end position+the current actual readahead size)/2].

11. The method according to claim 9, wherein a readahead end position is updated as the last readahead end position plus the current readahead size.

12. The method according to claim 1, further comprising:
in a case where the data amount that differs between the current reading offset and the last reading end position is within one random window, adding 1 to the number of instances of sequential reading, and adding a preset length to the data amount of sequential reading.

13. The method according to claim 1, wherein determining whether the data amount that differs between the current reading offset and the last reading end position is within one random window comprises:
determining whether |current reading offset−last_pos|<=fw, wherein last_pos is the last reading end position, and fw is the local random reading window; and
in a case where |current reading offset−last_pos|<=fw, determining that the data amount that differs between the current reading offset and the last reading end position is within one random window.

14. The method according to claim 1, wherein the local random reading is a reading process in which out-of-order reading is performed within the local random reading window but the overall reading is sequential reading.

15. The method according to claim 2, further comprising:
in a case where the current reading is not local random reading, updating a current reading end position to a current reading offset plus a current reading length.

16. The device according to claim 4, wherein the processor is further configured to execute the instructions to, in a case where the data amount that differs between the current reading offset and the last reading end position is within one random window, add 1 to the number of instances of sequential reading, and add a preset length to the data amount of sequential reading.

* * * * *